No. 662,135. Patented Nov. 20, 1900.
S. D. ROOP.
COMBINED PLANTER AND FERTILIZER DISTRIBUTER.
(Application filed Aug. 23, 1900.)
(No Model.) 2 Sheets—Sheet 1.
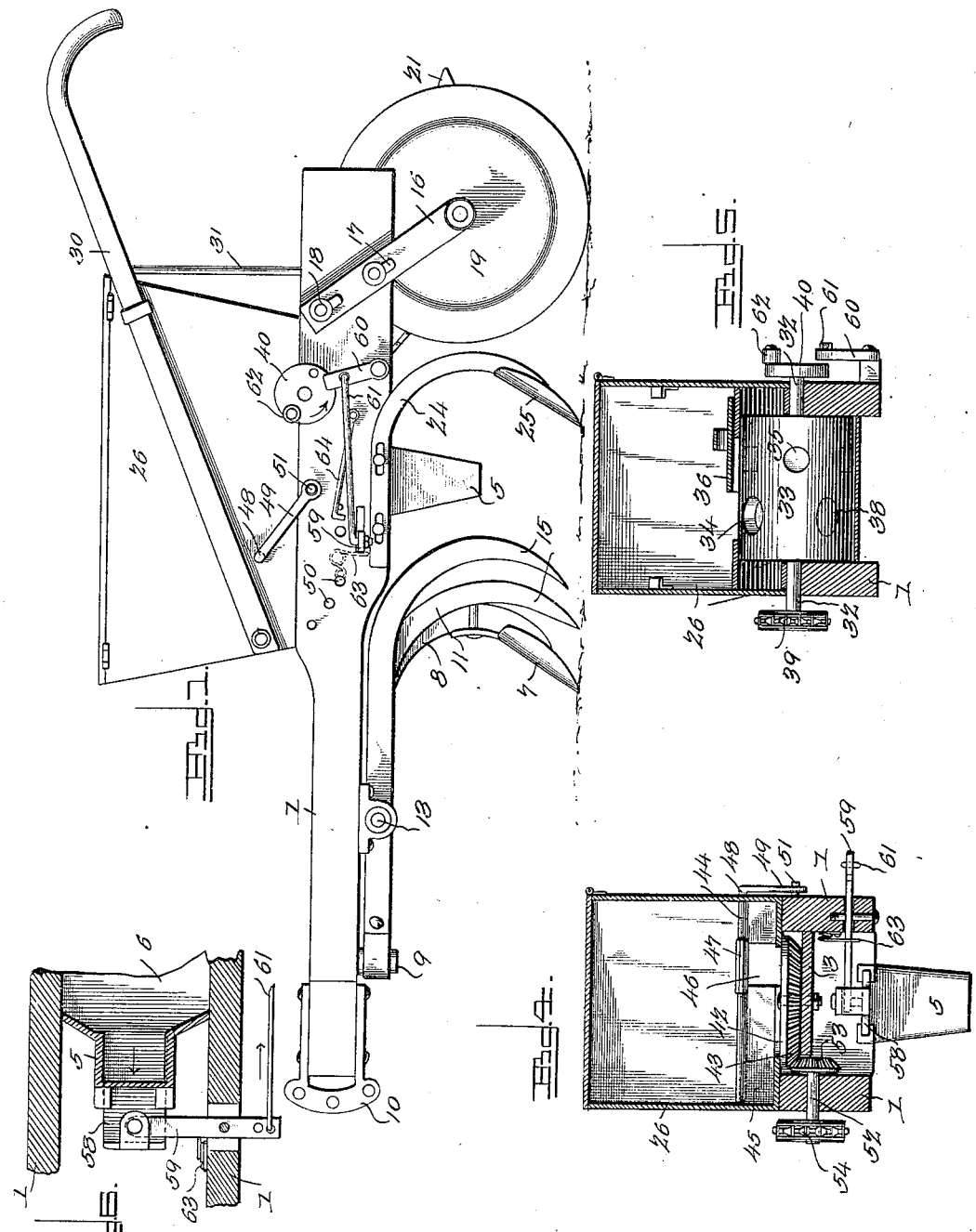

No. 662,135. Patented Nov. 20, 1900.
S. D. ROOP.
COMBINED PLANTER AND FERTILIZER DISTRIBUTER.
(Application filed Aug. 23, 1900.)
(No Model.) 2 Sheets—Sheet 2.
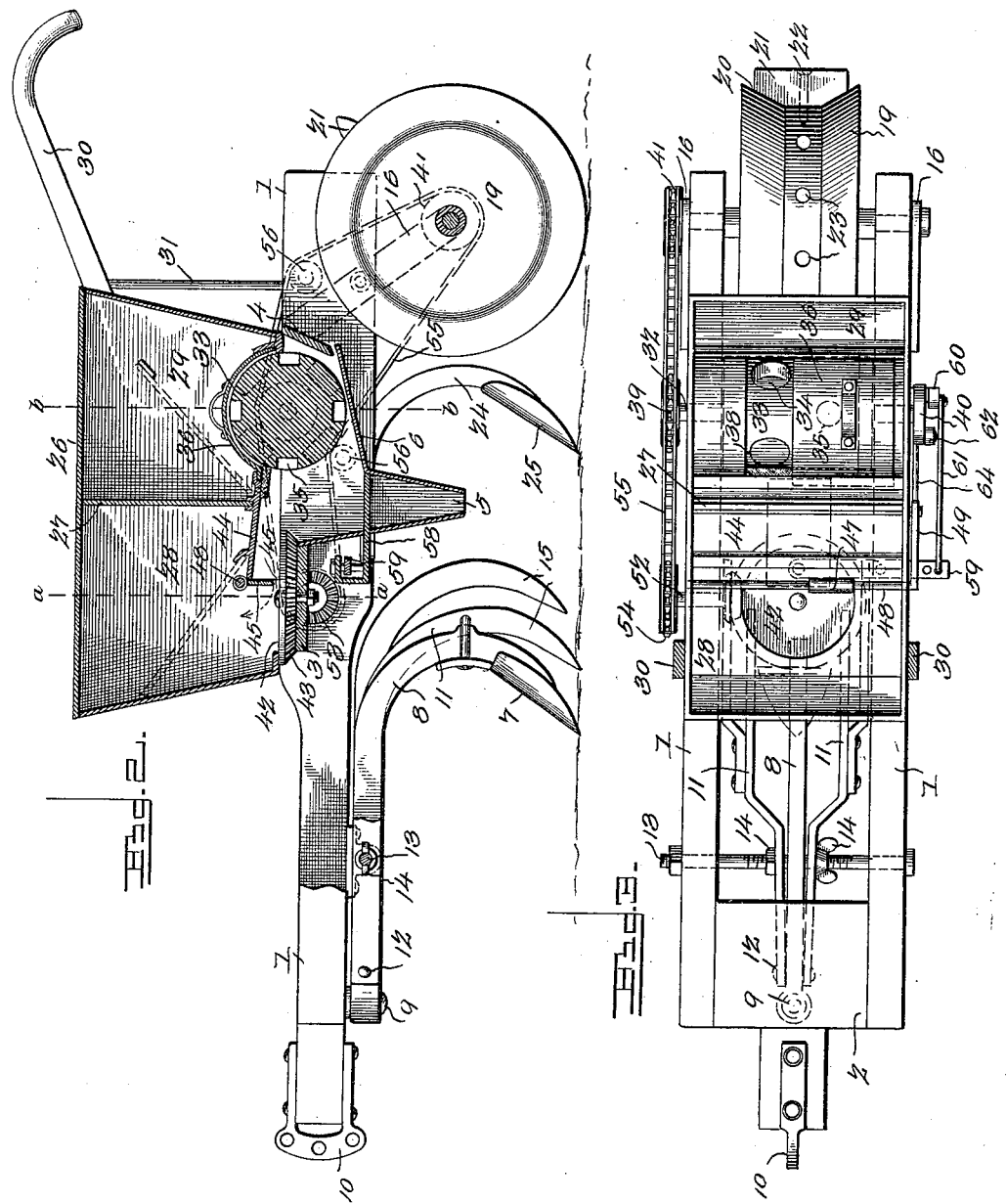
Witnesses
S. D. Roop Inventor
by C. A. Snow & Co.
Attorneys

UNITED STATES PATENT OFFICE.

SILAS D. ROOP, OF GOODES, VIRGINIA.

COMBINED PLANTER AND FERTILIZER-DISTRIBUTER.

SPECIFICATION forming part of Letters Patent No. 662,135, dated November 20, 1900.

Application filed August 23, 1900. Serial No. 27,826. (No model.)

*To all whom it may concern:*

Be it known that I, SILAS D. ROOP, a citizen of the United States, residing at Goodes, in the county of Bedford and State of Virginia, have invented a new and useful Combined Planter and Fertilizer-Distributer, of which the following is a specification.

My invention is an improved combined planter and fertilizer-distributer adapted for planting corn, sugar-cane, beans, peas, and other seeds, either in hills or drills and either with or without fertilizer, and which is also adapted for dropping the fertilizer simultaneously with the seeds in hills or for drilling the seeds and fertilizer, and which is also adapted for drilling the fertilizer without seeding the drills or dropping fertilizer in hills without seeding the same and for marking the fertilized hills, so that they may be subsequently planted.

My invention consists in the peculiar construction and combination of devices hereinafter fully set forth, and pointed out in the claims.

In the accompanying drawings, Figure 1 is a side elevation of a combined planter and fertilizer-distributer embodying my improvements. Fig. 2 is a vertical longitudinal sectional view of the same. Fig. 3 is a top plan view of the same. Fig. 4 is a vertical transverse sectional view taken on a plane indicated by the line $a$ $a$ in Fig. 2. Fig. 5 is a similar view taken on a plane indicated by the line $b$ $b$ of Fig. 2. Fig. 6 is a detail horizontal sectional view taken through the spout and showing the cut-off plate therein, the lever to operate said cut-off plate, and the operating-rod for said lever.

In the embodiment of my invention the side bars 1 of the frame are connected together at their front ends by a cross-block 2, and are connected together at a suitable distance from their rear ends by a cross-bar 3. The cross-bar 4 is located at a suitable distance in rear of the cross-bar 3, and to the said crossbars is secured a depending spout 5, the rear upper portion of which has an offset 6.

A furrow-opening plow 7 is carried by a beam 8, the front end of which is secured under the block 2, as at 9. Said block has a clevis 10 at its front end. A pair of beams 11 are secured on opposite sides of the beam 8, as at 12, at their front ends. Said beams 11 may be adjusted laterally, so as to widen or narrow the space between their rear ends, and said beams, together with the beam 8, are supported on a transversely-disposed bolt 13, which connects the side bars 1 and is provided with adjusting-nuts 14 for widening or narrowing the space between the rear ends of the beams 11. Each of the latter has a pair of fenders 15, one disposed in advance of the other and one without the other, and said fenders operate to roll stones and other obstructions out of the furrow.

A pair of standards 16 are bolted on opposite sides of the frame 1, near the rear end thereof, and have adjusting-openings 17 for the bolts 18, whereby said standards may be adjusted. A traction-wheel 19 is carried by the said standards and is provided with a grooved periphery 20, preferably of the form shown in Fig. 3, and in which is adapted to be secured a marking-block 21 by a screw 22, the periphery of the wheel having a series of adjusting-openings 23 for said screw, by means of which the marking-block may be attached to the wheel at any desired point.

A pair of beams 24 are adjustably secured on the sides of the frame 1 and carry covering-shovels 25. The latter, as will be observed by reference to the drawings, are located at an appropriate distance in rear of the spout 5. On the side bars 1 is secured a hopper 26, which is provided with a removable partition-plate 27, whereby the hopper may be divided transversely into two compartments, the forward compartment 28 being for fertilizer and the rear compartment 29 being for seeds. A pair of handles 30 are secured on the sides of the hopper and braced, as at 31.

A shaft 32 is journaled in bearings in the side bars 1 and carries a seed-cylinder 33, which is disposed in the lower side of the seed-compartment of the hopper. The said seed-cylinder is provided with two series of seed-cups 34 35, the former, which are adapted for seeds—such as corn, peas, or beans—being larger than the latter, which are adapted for smaller seeds, such as sugar-cane. A curved plate 36, which is adapted to be transversely disposed over the seed-cylinder and in the bottom of the seed-compartment of the hopper, may be so located therein as to cover either the cups 34 or the cups 35, or both of said series of cups, when it is not desired to use the machine for planting. The seed-cups are provided with suitable plugs, (indicated at 38,) by means of which any number of them may be closed, so that only one or more cups will be operated at a single revolution of the seed-cylinder. Hence the machine is adapted for planting the seeds either in hills or in drills, as will be understood. The shaft 32, which carries the seed-cylinder, is provided at one end with a sprocket-wheel 39 and at the other end with a disk 40. The shaft of the wheel 19 has at one end a sprocket-wheel 41.

On the cross-bar 3 is mounted a revoluble fertilizer-disk 42, which is horizontally disposed, and is provided on its lower side with a beveled-gear 43. The said fertilizer-disk is partly covered by a bottom plate 44, which forms the bottom of the rear portion of the fertilizer-compartment of the hopper, and from the said bottom plate 44 depends a cut-off plate or sweep-plate 45, which extends partially across the fertilizer-disk and bears upon the same and has an opening 46, through which fertilizer will be carried to the rear side of the sweep-plate as the fertilizer-disk rotates, and as the latter continues to rotate the fertilizer will be swept therefrom by the sweep-plate 45 and caused to drop in the spout 5. A gate 47 is carried by a shaft 48, which is journaled in the sides of the hopper, said gate being so disposed that it may close the opening 46 or open the same to any required extent, and thereby regulate the quantity of fertilizer distributed by the machine. The said shaft 48 has at one end an arm 49, which may be secured at any appropriate adjustment by any suitable means. As here shown the side bar constituting one side of the supporting-frame is provided with a series of adjusting-openings 50, and a pin 51 may be inserted in an opening in the outer end of said arm and in any one of the openings 50 in order to lock the gate at any required adjustment.

A stub-shaft 52 is journaled in one of the side bars 1 and is provided at its inner end with a beveled pinion 53, which engages the gear 43 of the fertilizer-disk, and at the outer end of the said shaft is a sprocket-wheel 54. A chain 55 connects the sprocket-wheels 41, 39, and 54. One or more suitable chain-guide sheaves 56 (indicated in dotted lines in Fig. 2) may be employed to appropriately dispose the leads of the chain.

A cut-off plate 58 operates transversely in the spout 5 and projects from the front side thereof. Said plate is connected to the inner end of a lever 59, which projects beyond one side of the machine-frame and is connected to a tappet-arm 60 by a pitman 61. The disk 40 carries one or more tappets 62, which by engagement with the tappet-arms 60 operate the latter and cause the plate 58 at each engagement of a tappet with the tappet-arm to open and drop the seeds and fertilizer thereon into a hill. A spring 63 is employed to return the cut-off plate 58 to its initial position. (Shown in Figs. 1 and 6.)

When it is desired to plant seeds and distribute fertilizer in the drills, the cut-off plate 58 is thrown out of action by moving the lever 59, so as to cause said plate to open the spout 58, and then engaging a hook 64 with said lever.

By appropriately proportioning the parts of the machine the same may be adapted for planting seeds in hills at any desired distance apart. When it is desired to plant seeds without fertilizer, the partition 27 may be inclined forwardly in the hopper in the position indicated in dotted lines in Fig. 2, thereby cutting off the fertilizer apparatus and proportionately enlarging the capacity of the seed-compartment of the hopper. When it is desired to distribute fertilizer in hills without planting the same, as for tobacco-hills, the partition 27 is disposed in a rearwardly-inclined position in the hopper, as shown in dotted lines in Fig. 2, thereby cutting off the seed-dropping mechanism and proportionately enlarging the fertilizer-compartment of the hopper. When thus planting fertilizer in hills, the cut-off plate 58 is employed and the marking-block is appropriately located on the wheel 19, so as to mark the hills in which the fertilizer has been placed by the machine, so that the fertilized hills may be subsequently planted.

It will be understood that the machine may be also used for planting in check-rows.

Having thus described my invention, I claim—

1. In a planter, the combination with a frame having a furrow-opener and a traction-wheel, of a hopper, a revoluble seed-dropping mechanism therein having a revoluble tappet at one end of its shaft, a discharge-spout, a cut-off plate therein, a spring to normally close said cut-off plate in the spout, an operating-lever for said cut-off plate, a tappet-arm disposed in the path of the revoluble tappet, a pitman connecting said lever to said tappet-arm, and a hook to engage said operating-lever and lock the same and dispose the tappet-arm out of the path of the revoluble tappet, substantially as described.

2. In a combined planter and fertilizer-distributer, the combination of the frame having the furrow-opener, traction-wheel and discharge-spout, the hopper having the partition-plate whereby the same is divided into seed and fertilizer compartments, a revoluble seed-dropping mechanism in the bottom of the seed-compartment, a horizontally-disposed revoluble fertilizer-disk in the bottom of the fertilizer-compartment of the hopper, the latter having a sweep-plate on said disk to sweep fertilizer therefrom into the spout, said sweep-plate having an opening and a regulating-gate for said opening, for the purpose set forth, a cut-off plate in the spout, an operating-lever for said cut-off plate, a spring to normally close said plate, a tappet-arm disposed in the path of the revoluble tappet, a pitman connecting said tappet-arm to said operating-lever, and connections, substantially as set forth between the traction-wheel and fertilizer-disk and seed-dropping mechanism, substantially as described.

3. In a machine of the class described, the combination of a hopper, a discharge-spout, a horizontally-disposed revoluble fertilizer-disk in the bottom of the hopper and extending over one side of the discharge-spout, a sweep-plate depending from the bottom of the hopper and bearing on said disk, the said sweep-plate having an opening therein, a shaft in said hopper, a gate on said shaft adapted to entirely or partly close said opening and means to secure the said shaft at any desired adjustment of the said gate, substantially as described.

In testimony that I claim the foregoing as my own I have hereto affixed my signature in the presence of two witnesses.

SILAS D. ROOP.

Witnesses:
H. B. JOPLING,
G. W. WAALDING.